United States Patent [19]
Baremor

[11] 3,831,462
[45] Aug. 27, 1974

[54] LIMITED SLIP DIFFERENTIAL
[75] Inventor: Jerry F. Baremor, Marshall, Mich.
[73] Assignee: Eaton Corporation, Cleveland, Ohio
[22] Filed: Jan. 14, 1974
[21] Appl. No.: 433,064

Related U.S. Application Data
[63] Continuation of Ser. No. 235,280, March 16, 1972.

[52] U.S. Cl. ................................................ 74/711
[51] Int. Cl. ........................................... F16h 1/44
[58] Field of Search ...................................... 74/711

[56] References Cited
UNITED STATES PATENTS
2,609,711  9/1952  Wildhaber ........................... 74/711
3,606,803  9/1971  Otteman ............................. 74/711

Primary Examiner—Samuel Scott
Assistant Examiner—J. Reep
Attorney, Agent, or Firm—Teagno & Toddy

[57] ABSTRACT

A limited slip differential mechanism includes a normally disengaged regenerative self energizing clutch assembly for producing lock-up when activated. Engagement of the clutch assembly is initiated by means of an actuator device which is in turn activated by a predetermined level of differential action between driving and driven members in the differential mechanism. The clutch assembly includes a first group of clutch friction elements which are connected for rotation with the driving member and another group of clutch friction elements connected for rotation with the driven members. Upon operation of the actuator, movement of a cam element is retarded relative to one of the driven members. The cam element presses the groups of clutch friction elements together to thereby provide a force which further retards relative rotation between the members. To provide a clutch which has smooth locking characteristics due to the gradual application of locking torque, the complemental friction surfaces have a dynamic coefficient of friction which constantly increases to a magnitude of at least 0.09 as the clutch is operated from a disengaged condition to a fully engaged condition. After initial actuation, the regenerative portion of the clutch assembly automatically increases the force pressing the complemental friction surfaces of the clutch friction elements together as a result of the previous retarding force until the driving and driven members are locked together.

11 Claims, 8 Drawing Figures

3,831,462

LIMITED SLIP DIFFERENTIAL

This is a continuation, division, of application Ser. No. 235,280 filed Mar. 16, 1972.

This invention relates to open and limited slip differentials and more particularly to open and limited slip differentials having a clutch system for locking the differential when a predetermined level of differential action is reached.

Known limited slip differentials are used in the drive train of a vehicle and include a carrier and differential gearing mounted on the carrier. The differential gearing includes a pair of side gears and pinion gears meshing therewith. The carrier is driven by a prime mover such as an automobile engine which in turn rotates the pinion gears through rotation of the carrier. The pinion gears in turn rotate the side gears which are drivingly connected to the wheels to thereby drive the vehicle.

When one of the wheels loses traction with the surface of the road, the limited slip differential or drive mechanism begins to differentiate and power is transmitted from the engine to the wheel which has lost traction and that wheel consequently begins to spin while the other wheel is not driven. When such a situation occurs, it is essential for the differential to lock so that the side gears are locked with respect to the carrier. Consequently, both of the side gears rotate at the same speed and the drive mechanism is not allowed to differentiate. In such a locked up condition, the wheel which has traction with the road will be driven at the same speed as the other wheel to thereby move the vehicle. When the vehicle is moved so that the wheel which lost traction with the road regains traction, the drive mechanism returns to its original condition where differentiation may occur.

It is important to note that the locked up position must not occur until the wheels are rotating relative to each other above a predetermined level. For example, the differential gear assembly must be able to differentiate when the vehicle goes around a corner. In such a case, the wheel on the inside of the turn will rotate at a slower speed than the wheel on the outside of the turn and the differential will allow such differentiation.

One known differential of the limited-slip type includes a friction disc clutch which is actuated to an engaged condition in response to a predetermined rate of relative rotation between driving and driven members. In the engaged condition, the friction disc clutch retards relative rotation between the driving and driven members. The clutch is energized to the engaged condition by a suitable actuator mechanism. Roper U.S. Pat. No. 3,324,744 illustrates such a differential.

Another known limited-slip differential is set forth in application Ser. No. 217,326 filed on Jan. 12, 1972 by Daniel W. Roper and entitled Drive Mechanism. This limited slip differential is self energizing and utilizes a friction clutch of the cone type. A differential carrier member, at least one side gear member and a clutch means for retarding relative rotation between the carrier and the side gear is provided in such a differential. The clutch means is a generally conical clutch element having a pressure relationship with one of the members to effect retardation of relative rotation between the side gear and the carrier member. An actuator device is provided to initiate actuation of the clutch means which is then fully engaged under the influence of self energization forces to retard relative rotation between the side gear and carrier when that relative rotation exceeds a predetermined level.

In certain prior art limited slip differentials the clutch locks up suddenly due to low maximum dynamic coefficients of frictions. Such a sudden application of the clutch produces a severe shock on the differential and associated components. Another problem incurred when the differential is locked up quickly is that the clutch may bounce into and out of engagement to produce a series of shocks on the differential.

The present invention provides a differential having a friction disc clutch which is smoothly engaged to lock up the differential. To provide this smooth engagement the clutch is of the self energizing type and has a dynamic coefficient of friction which constantly increases to at least 0.09 as the clutch is operated to an engaged condition under the influence of self energizing forces. The clutch is of the disc pack type and includes a plurality of discs operably associated with a camming means which engages a side gear of the differential.

It is an object of the present invention to provide a limited slip differential mechanism having a disc type clutch system which operates to lock a driving and a driven member together in a smooth manner to thereby eliminate severe shock and impact loadings on the differential and other associated components.

It is another object of the present invention to provide a limited slip differential mechanism including self energizing disc type clutch mechanism having a dynamic coefficient of friction which continuously increases to a value of at least 0.09 as friction discs are moved from a spaced apart condition to a condition of abutting frictional engagement to smoothly retard relative rotation between a driving and a driven member.

It is another object of the present invention to provide a limited slip differential mechanism comprising differential gearing members and self energizing clutch system which initially actuated to move friction discs toward each other from a spaced apart condition when relative rotation between driving and driven members exceeds a predetermined level and which self energizing clutch system includes from three to nine friction clutch discs operably associated with a cam which engages one of the driven members of the differential mechanism.

These and other objects and features of the invention will become more apparent upon a reading of the following description taken in connection with the accompanying drawings wherein.

Figure 1:
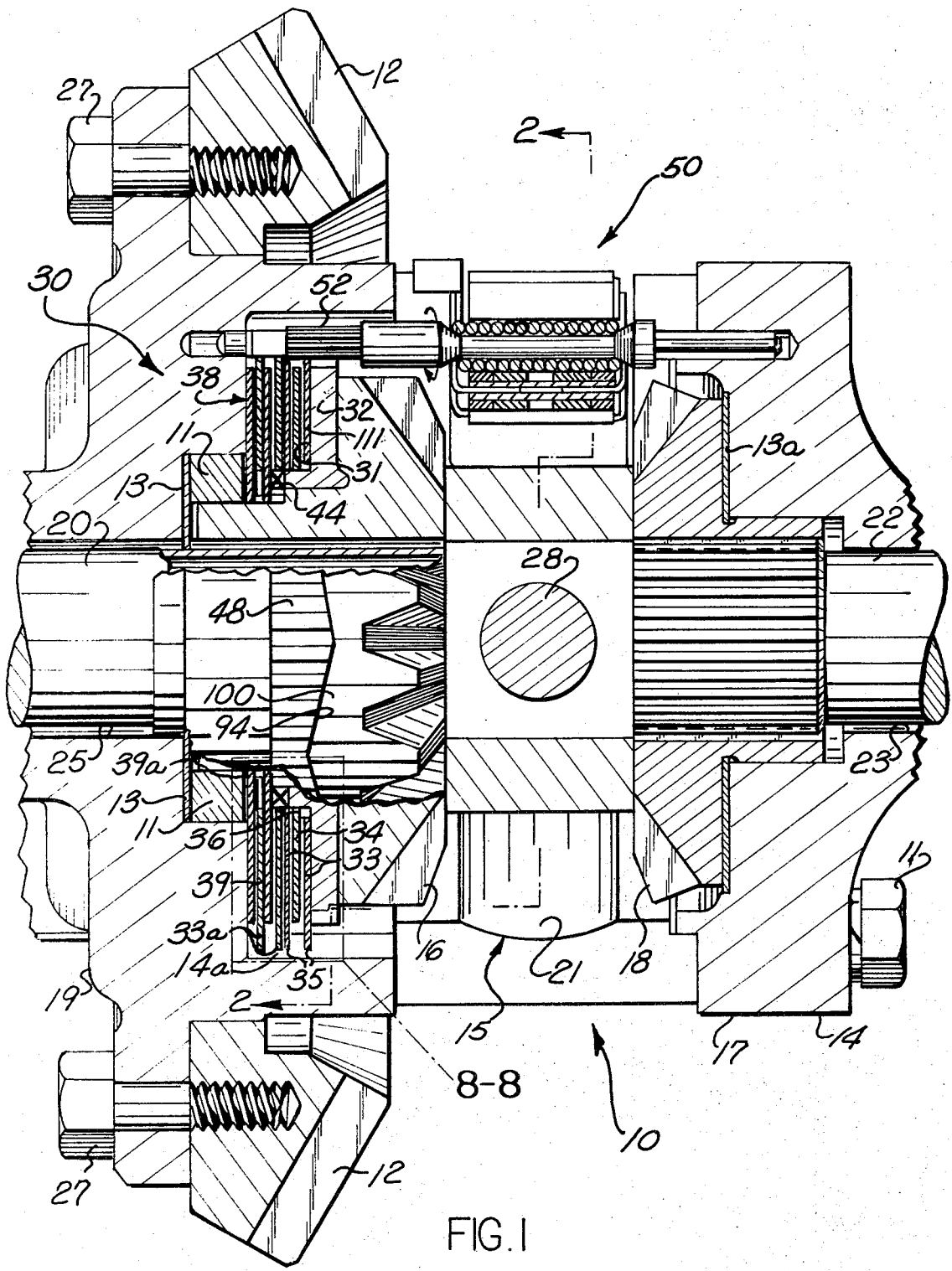
FIG. 1 is a plan view in partial section of a differential incorporating an actuator and a clutch system according to the present invention.

The present invention provides a new and improved limited slip differential mechanism which includes a self energizing clutch assembly which is operable to interconnect driving and driven members. The regenerative self energizing clutch assembly includes a clutch or cam element mounted for rotation with one of the members and a group of friction clutch discs connected with the driving member and another group of frictional clutch discs connected to the driven members. The face surfaces of these friction discs are engageable to prevent relative rotation between the driving and driven members. The dynamic coefficient of friction between these friction discs constantly increases to a value of at least 0.09 as the clutch is operated from a disengaged condition in which the discs are spaced apart to an engaged condition in which the discs are disposed in abutting friction engagement to assure smooth engagement of the clutch system.

One way that the upper limit or maximum dynamic coefficient of friction may be provided is by constructing the clutch surfaces as shown in U.S. Pat. No. 3,073,424 issued Jan. 15, 1963 to R. C. Russell.

The dynamic coefficient of friction acting between the clutch discs is continuously increased to this value by continuously increasing the biasing force acting on these clutch discs during the time in which the clutch system is being operated from the disengaged to the fully engaged position. An actuator assembly is provided for actuating the clutch assembly upon the occurrence of either a predetermined relative velocity or rate of acceleration between the driving and driven members. While the limited slip differential mechanism of the present invention is applicable to different environments, it is particularly adapted for use in a vehicle as a differential. Accordingly, as representative of a preferred embodiment of the present invention, the drawings illustrate a limited slip differential drive mechanism or assembly 10.

The differential drive assembly 10 includes an input ring gear 12 secured to a rotatable planet gear carrier or housing 14, a differential gear train 15, and a regenerative self energizing clutch assembly 30. It should be noted that the differential assembly 10 is enclosed within a casing (not shown) which in accordance with well known practices, is maintained at least partially filled with lubricating fluid or oil which coats the various components of the differential assembly.

The planet gear carrier 14 includes a pair of support portions adapted to be received in the bearings of a supporting structure, such as an axle housing, not shown, by which the carrier 14 is rotatably supported. The carrier 14 further includes a pair of members 17, 19 which are integrally formed with the abovementioned support portions and are secured together by screws 11 (only one of which is illustrated). The members 17, 19 define a gear chamber 21 in which the gear train 15 and the regenerative self energizing clutch assembly 30 are located. The support portions are provided with axial openings 23, 25 which communicate with the chamber 21 and receive driven or power output means as represented by axle shafts 22, 20, respectively, whose outer end portions are connected with traction wheels, or the like, not shown, and those inner, or adjacent end portions are splined to the gear train 15.

The differential drive assembly 10 includes the input ring gear 12 extending around and mounted on the carrier 14 by means of the connecting screws 27 which extend through a flange portion of the planet gear carrier 14. A suitable drive pinion, not shown, meshes with the ring gear 12 and represents the power input means for the differential drive assembly or mechanism 10 and upon rotation effects rotation of the ring gear 12 to rotate the planet carrier 14.

The gear train 15 is operable to transmit the rotary motion of the planet gear carrier 14 to the output shafts 20, 22. The gear train 15 comprises a pair of bevel side gears 16, 18 and a group of bevel pinion planetary gears 24, 26 disposed between and meshed in engagement with the side gears 16, 18 for drivingly connecting the latter. The side gears 16 and 18 are retained against outward movement by a thrust sleeve 11 and thrust washers 13 and 13a. The planetary pinion gears 24, 26 are rotatably supported by the carrier 14 by means of a pinion shaft 28 extending across the gear chamber 21.

The side gears 16, 18 and pinion gears 24, 26 are, in the preferred embodiment, all bevel gears of conventional form as far as the teeth thereof are concerned, and the tooth profiles are of a conventional shape having pressure angles values coming within the usual range of such values. The side gears 16, 18 are drivingly connected to the shafts 20, 22 respectively by means of complimentary splined portions.

In accordance with a feature of the present invention, the self energizing clutch assembly 30 is of the friction disc type and is operable between a disengaged condition wherein the axle shafts 20 and 22 are freely rotatable relative to each other and an engaged condition wherein the clutch assembly 30 drivingly interconnects the axle shafts 20 and 22 through the carrier 14 and side gears 16, 18 to retard relative rotation therebetween.

In the preferred embodiment as shown in FIG. 1, the clutch assembly 30 comprises two separate and distinct clutching portions. One portion is "active" to provide the regenerative self energizing force for fully actuating the clutch mechanism. The other portion is "inactive" and merely increases total torque capacity after actuation.

Figure 2:
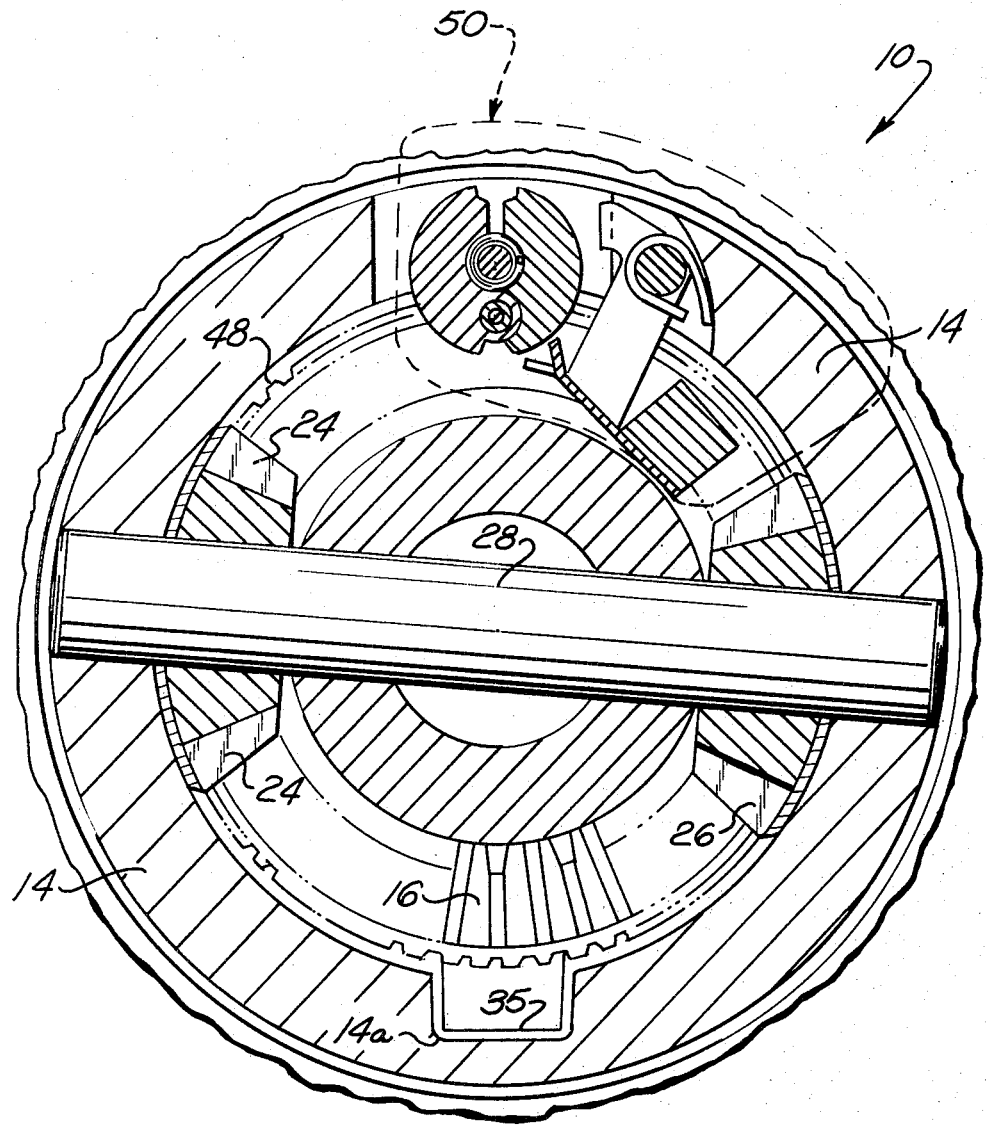
FIG. 2 is a view of the section taken along the line 2—2 in FIG. 1.

A first portion 31 is a regenerative self energizing portion including a cam member 32 and a plurality of alternately interleaved clutch discs 33 and 34 associated therewith. The clutch discs 33 are mounted for positive rotation with the carrier 14 by means of tabs 35 thereon received in recesses 14(a) of the carrier 14 as shown in FIG. 2. This particular mounting arrangement is more clearly shown in Russell U.S. Pat. No. 3,052,137. The clutch disc 34 is mounted for positive rotation with the cam member 32 by means of splines 36 and 37 on the disc 34 and cam member 32 respectively. This portion of the clutch may be termed "active" as it provides the regenerative force which insures that the clutch will reach the fully engaged position.

A second portion 38 of clutch assembly 30 is provided to give increased torque transmitting capacity to the clutch assembly 30 when in the fully engaged position. The second portion 38 also comprises a plurality of alternately interleaved discs 33(a) and 39. The discs 33(a) are identical in structure and mounting arrangement to the discs 33 of the first portion and are likewise configured for positive rotation with the carrier 14. The discs 39 are mounted for positive rotation with side gear 16 by means of splines 39(a) which engage corresponding splines on the side gear 16. In order to provide for smooth engagement of the clutch 30, the number of friction discs in the active group is preferably greater than two and less than ten as will hereinafter be more fully described. When the clutch assembly 30 is in the disengaged condition, the friction surfaces of the discs 33, 34, 33(a) and 39 are axially spaced apart from each other. This axial spacing between the clutch surfaces enables the carrier 14 to be freely rotated relative to either side gear 16 or 18 when the clutch assembly 30 is in the disengaged condition.

The interface between the "active" and "inactive" portions of the clutch assembly 30 occurs where one disc 33 is adjacent a disc 33a both of which are associated with the carrier 14. This also provides sufficient space to prevent complete collapse of the wave spring 44 upon actuation of the clutch assembly.

In order to lock up the differential 10, the regenerative self energizing clutch mechanism 30 is provided, which will act when actuated to interconnect the side gear 16 and the carrier housing 14 to lock up the differential. The cam member 32 of the clutch mechanism 30 is drivingly connected to the side gear 16 via wedging ramp or cam surfaces 40 and 41 formed in the cam member 32 and side gear 16 respectively. These cam surfaces 40, 41 serve to move the friction discs 33, 34, 33(a) and 39 into engagement when relative rotative movement between the side gear 16 and the cam member 32 is induced in a manner to hereinafter be described. When the friction discs 33, 34, 33(a) and 39 are in a fully engaged position, relative rotation is prevented by static friction forces acting between abutting face surfaces on the discs.

Figure 3:
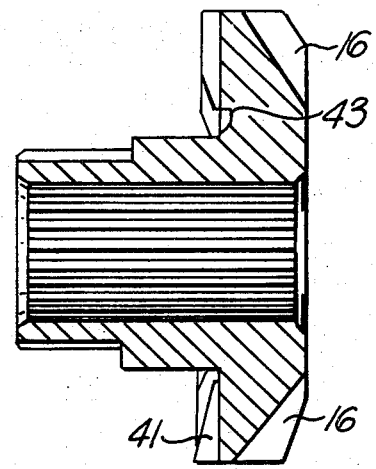
FIG. 3 is a sectional view of a side gear of the present invention having a cam surface thereon.
Figure 4:
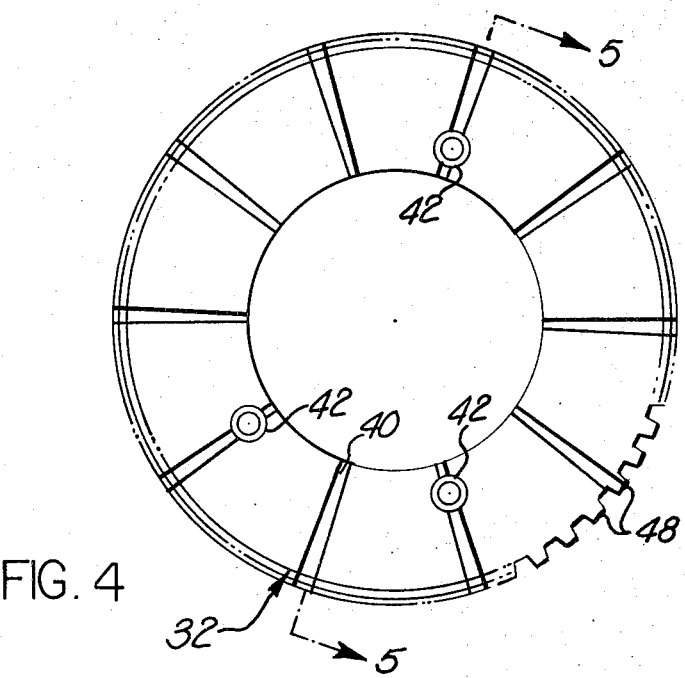
FIG. 4 is a plan view of a cam member having a surface which co-operates with the cam surface on the side gear of FIG. 3.
Figure 5:
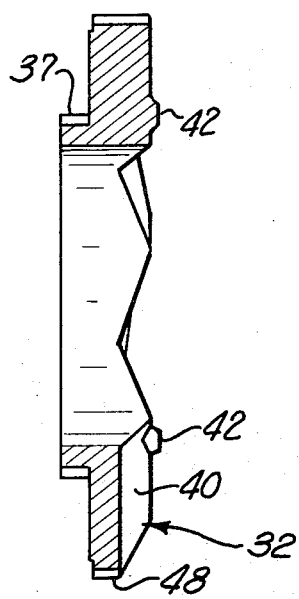
FIG. 5 is a sectional view taken along line 5—5 of FIG. 4.

In order to prevent extremely low rates of differentiation or inertia forces from causing relative motion between the cam surfaces 40 and 41 thereby actuating clutch mechanism 30, the cam member 32 is provided with small frustro conical protrusions 42 which engage corresponding recesses or detents 43 in side gear 16 as shown in FIGS. 3 and 4 respectively. The protrusions 42 are slightly higher than the depth of recesses 43 whereby the cam surfaces 40 and 41 are spaced slightly apart when the clutch 30 is in the fully disengaged position.

Biasing of the cam member 32 to the right opposing actuation in FIG. 1 is accomplished by the wave spring 44 disposed between one of the inactive discs and the cam member 32. This keeps the protrusions 42 seated in recesses 43. Thus, the cam member 32 and the side gear 16 rotate at the same rotational speed when the clutch 30 is in the disengaged condition.

Although the "inactive" portion 38 of the clutch assembly 30 continuously retards relative rotation between the carrier 14 and side gears 16, 18, the clutch 30 when in the fully disengaged position is substantially incapable of restraining any movement between the carrier 14 and the side gears 16, 18.

Therefore, some means must be provided to initiate movement of cam member 32 relative to side gear 16 upon the occurrence of a predetermined rate of slip between the carrier 14 and side gears 16 or 18. This means must produce a force acting on cam member 32 which is sufficient to overcome the detent clutch provided by protrusions 42 and recesses 43 and thereby initiate relative motion between cam member 32 and side gear 16 to move clutch plates 33, 34, 33a and 39 toward contact with each other. Once contact reaches a predetermined point, the frictional retarding force developed between the "active" group of discs causes the regenerative self energizing feature provided by the proper cam ramp angle, disc surface maximum coefficient of dynamic friction of at least 0.09 and number of "active" clutch plates to come into play to insure smooth clutch operation to full engagement.

In order to initiate movement between cam member 32 and side gear 16 upon the occurrence of a predetermined level of relative slip between carrier 14 and one of the side gears 16 or 18, the cam member 32 is provided with gear teeth 48 on the periphery thereof. An actuator 50 having a spline shaft 52 which drivingly engages gear teeth 48 is provided. The actuator 50 is mounted for rotation with the carrier 14 and is operable upon a predetermined rate of relative movement between carrier 14 and side gear 16 or 18 to retard rotation of cam member 32 relative to side gear 16.

The actuator 50 is of a type more fully described in U.S. Pat. No. 3,606,803 issued to W. Ottemann. The specification of that application is hereby incorporated by reference into this application.

For the present, it is sufficient to state that when a predetermined rate of slip occurs between the carrier 14 and side gears 16 or 18, actuator 50 is operable to retard cam member 32 slightly relative to side gear 16 thereby initiating actuation of clutch pack 30.

From the above description it should be clear that when the regenerative clutch 30 is in the disengaged condition, normal differential action will occur, wholly uninhibited, since no lock-up forces exist until the time of clutch engagement except for viscous shear drag forces between clutch discs 33, 34 33a and 39 and for the frictional and inertia forces in the actuator mechanism 50 and the other driven parts. The wavespring 44 and detents 43 insure that the cam member 32 will not be moved axially by the cam surfaces 40, 41 reacting to the inertia of the cam member 32 nor the inertia or friction forces created by the actuator assembly 50 which is driven by the cam member 32 during differential action.

When differential action reaches a predetermined level, indicating a wheel spin condition, shaft 52 of actuator 50 will retard cam member 32 slightly relative to side gear 16.

Figure 6:
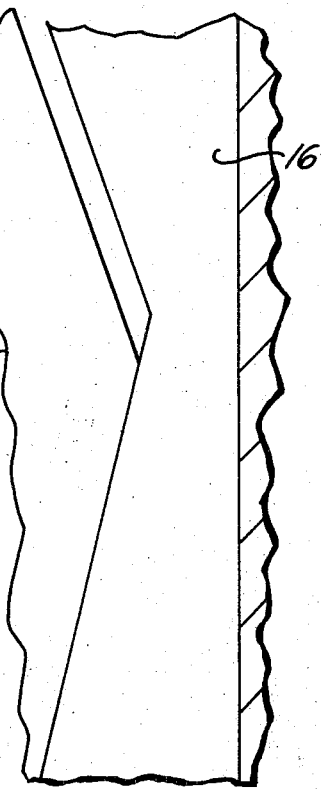
FIG. 6 is an enlarged partial view of the clutch surfaces of the present invention.

Actuator 50 thus provides an initial actuating force which, although it is relatively small is sufficient to retard movement of the cam member 32 relative to the side gear 16 by virtue of the drive connection of the gear teeth 48, 52. This initial actuating force causes relative rotation between the cam member 32 and side gear 16 which brings the outwardly protruding portions 42 of the cam member 32 and the recesses 43 of the side gear 16 and the cam surfaces 40 on the cam element 32 (see FIG. 6) are brought into abutting engagement by the initial actuating force from the actuator assembly 50.

Abutting engagement of the sloping portions of the cam surface 40 on the cam element 32 against similarly sloping portions of the cam surface 41 on the side gear 16 causes an axially directed force to be applied against the cam element 32. This axially directed force on the cam element 32 moves the clutch friction surfaces of the friction discs 34 and 39 toward the clutch friction surfaces of the friction discs 33 and 33a respectively associated with the carrier 14 (see FIG. 1).

The initial actuating force provided by the actuator 50 is insufficient, by itself, to effect operation of the clutch assembly 30 from the disengaged condition to a fully engaged condition. Therefore, in the absence of the self energizing characteristics of the clutch assembly 30, the clutch assembly would remain in an intermediate condition between the disengaged and fully engaged conditions and would be ineffective to prevent differentiation by the differential 10.

The self energizing characteristics of the clutch assembly 30 provides a self energizing force to complete the operation of the clutch assembly to the fully engaged condition after the clutch assembly has been operated to the intermediate condition by the actuator 50. This self energization results from drag forces which are generated between the friction discs 33, 34, 33a and 39 by the lubricating oil in the differential casing. Of course, these viscous drag forces increase as the friction discs are moved toward each other during operation of the clutch assembly 30 from the disengaged condition to the intermediate condition under the influence of the actuator 50. in addition when the clutch assembly 30 is in the intermediate condition high points, aberrations and irregularities on the clutch discs 33, 34, 33a, 39 start to come into contact to provide mechanical friction drag.

The drag forces between discs 33 and 34 of active clutch portion 31 function as self energizing forces for the clutch assembly 30 by retarding relative rotation between the cam member 32 and housing or carrier 14 thereby causing relative movement between cam member 32 and side gear 16. Due to the camming surfaces 41 and 40 on side gear 16 and cam member 32 respectively, this relative movement causes axial movement of the cam member 32 thereby continuously increasing the compressive force on clutch assembly 30 and thereby actuating the clutch assembly from the intermediate condition to the fully engaged condition.

Another feature of the differential is a smooth locking action when required by tractive conditions. To accomplish this feature, the friction discs 33, etc. have a characterized surface capable of developing a high dynamic coefficient of friction so that the following smooth locking action is provided. One method of making such a surface is as shown in Russell U.S. Pat. No. 3,073,424.

The clutch surface of the discs are spaced apart and transmit only relatively small viscous shear forces when the clutch is disengaged. When the cam member 32 moves axially to operate the clutch 30 to the fully engaged condition by moving the friction discs 33, 34, 33(a) and 39 into contact, relative rotation occurs between the discs. At this point the locking torque is initially extremely low since only viscous shear forces are present between the spaced apart discs. As the friction discs are moved toward each other, the coefficient of dynamic friction for the clutch system constantly increases so that a constantly increasing retarding force is provided to smoothly interlock the shafts 20 and 22 and the vehicle wheels. Thus, when the final lock up is achieved, relative rotation between axle shafts has been previously retarded under the influence of dynamic friction forces generated between the friction discs 33, 34, 33a and 39 before they become interlocked due to abutting friction engagement between their face surfaces. This smoothly increasing retarding torque before lock up is achieved by relatively high levels of dynamic friction and has the effect of dampening the lock up and dissipating impact energy.

These relatively high levels of dynamic friction are caused by the combination of the surface pattern on the clutch discs and constantly increasing axial load caused by the camming surfaces.

It has been discovered that based on various operational and design parameters there is a critical coefficient of dynamic friction above which smooth locking of the clutch system is assured. One example of such a design as shown in FIG. 1, is a clutch system 30 which has one friction disc 34 splined to the cam member 32 and two friction discs 33 driven by the carrier 14 through tabs 35 to provide sufficient regenerative forces to fully actuate clutch assembly 30. Additional clutch friction surface area is provided by the remaining interleaved clutch discs 33a and 39 attached to the side gear and carrier respectively so that full lock, approximately 2,000 ft. lb. of torque is generated under the influence of a maximum coefficient of dynamic friction of at least 0.09. For maximum coefficients of dynamic friction below 0.09 the locking engagement is more abrupt and produces an objectional impact to the driveline.

Normally, coefficients of friction are not considered as variables. However, in the self energizing disc type clutch system of the present invention, torque is transmitted during operation of the clutch system from the disengaged condition to the engaged condition in the following sequence to provide for a smooth lock up of the clutch system:

1. The clutch discs 33–39 are out of contact when the clutch system is disengaged and there are viscous shear drag forces transmitted by the oil between the discs. The actuator 50 is activated to actuate the clutch system 30 toward the intermediate condition and starts movement of the clutch discs toward each other with a resulting increase in the viscous drag on the clutch discs.
2. Continued movement of the clutch discs toward each other under the influence of self energizing forces causes high points, aberrations or irregularities on the clutch discs to start to come into contact and some mechanical friction comes into existence to transfer an increasing torque.
3. This frictional force and viscous drag create self energizing forces to cause further movement of the discs 33–39 toward each other and to retard relative rotation between the axle shafts 20 and 22 with a constantly increasing force.
4. Increased mechanical contact occurs between the relatively moving discs and consequently the active clutch portion 31 increases the self energizing forces providing for engagement of the discs while simultaneously increasing the forces retarding relative rotation between the axle shafts 20 and 22.
5. Full abutting surface contact occurs and the clutch discs are frictionally held against rotation relative to each other and the clutch system is fully engaged and the differential 10 is locked.

Figure 7:
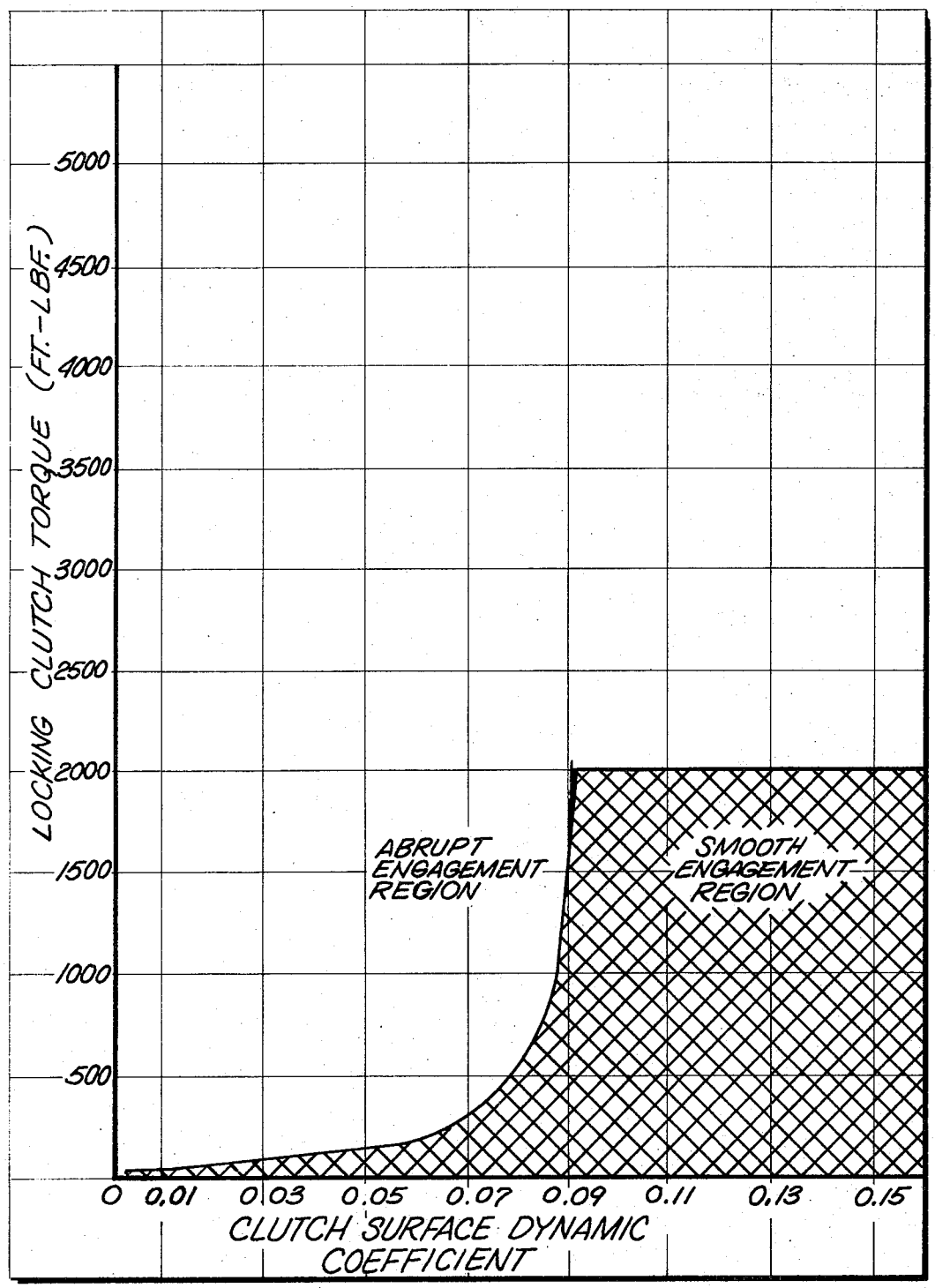
FIG. 7 is a graph depicting the change in the dynamic coefficient of friction for a clutch system constructed in accordance with the present invention.

The graph shown in FIG. 7 illustrates an example of the manner in which the coefficient of dynamic friction for the previously described clutch system 30 increases as the friction discs 33, 34, 33a, 39 are moved together during smooth engagement of the clutch system. The self energizing clutch system 30 has maximum dynamic coefficient of friction of at least 0.09. This graph shows that only relatively low viscous shear forces are transmitted between the spaced apart discs 33, 34, 33a, 39 when the clutch system 30 is disengaged. Therefore, the dynamic coefficient of friction for the disengaged clutch system 30 is very small and the retarding or locking torque transmitted by the clutch system is very low. The regenerative self energizing clutch system 30 causes an ever increasing amount of torque to be transmitted as the friction discs are moved toward each other with progressively increasing load. The clutch is locked solid after the friction discs have been pressed in abutting friction engagement. Thus, the locking torque level is controlled by the dynamic coefficient of friction of the clutch system as it is being engaged. Immediately before frictional locking engagement of the clutch discs, this coefficient of dynamic friction is shown at the point the curve becomes substantially asymptotic to a vertical line, or 0.09. When the coefficient of friction of the clutch discs 33–39 is 0.09 or greater, a smooth engaging differential is provided.

If the maximum coefficient of dynamic friction for the clutch system 30 is 0.09 or greater, the curve depicting the changing dynamic coefficient of friction will be in the cross hatched area to the right of the curve for a maximum coefficient of dynamic friction of at least 0.09. Therefore, a smooth locking engagement of the clutch will occur since the increase in the coefficient of dynamic friction during engagement of the clutch system will be sufficient to dampen lockup. However, if the maximum coefficient of dynamic friction for a clutch system is less than 0.09, the curve will be disposed in the area of abrupt lockup.

After the regenerative self energizing clutch 30 is initially actuated by the actuator 50, the clutch operates in a regenerative self energizing manner to automatically increase the frictional retarding force until there is no relative rotation between the gears and the carrier 12 or that relative rotation drops below a predetermined level. The initial retarding force exerted on the cam member 32 allows the side gear 16 to drive the cam member 32 relative thereto. This driving force brings the cam surfaces 40, 41 into engagement and due to the relative rotation of the members 16, 32 creates axial movement of the cam member 32.

When the clutch member 32 moves axially towards the carrier 14, the dynamic retarding frictional force between the active clutch surfaces of the cam member and carrier 32, 14 respectively, increases. This retarding frictional force will cause the retardation of the cam member 32 to react against the side gear 16. The cam surfaces 40, 41 are designed so that this interaction between the members 32, 16 will produce further axial movement of the cam member 32 and thereby increase the retarding frictional force. This regenerative self energizing action continues until a speed-torque balance between the driving and driven members is automatically attained.

This method of automatically effecting a speed-torque relation between the carrier 14 and the side gears 16, 18 and consequently the shafts 20, 22 is a self energizing action method because the power for creating an axial force on the friction clutch member 32 is derived from the momentum inherent in the power members themselves. The action is also cumulative because the initially created torque or "simulated friction force" applied by the actuator 50 reacts on the members 32, 16 to cause relative rotation therebetween and operate the cam surfaces 40, 41. This relative rotation produces axial movement of the member 32 which consequently increases the friction between the carrier 14 and the member 32. This increase in retarding torque acts to relatively rotate the cam 40, 41 still more to provide further axial movement of the cam member 32, which in turn acts to increase the retarding torque and so on.

Figure 8:
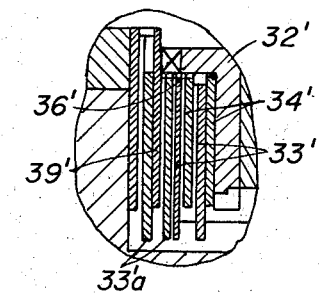
FIG. 8 is a fragmental view approximately along line 8—8 of FIG. 1 showing an alternate embodiment wherein a plurality of clutch plates are connected to the cam member with similar elements designated by the same numeral with a prime(').

The axle shaft 20 is operatively connected by the gear train 15 to the side gear 16 and carrier 14 (FIG. 1). Of course, the side gear 18 is directly connected to the axle shaft 22. Therefore, any tendency of the axle shaft 20 to rotate relative to the axle shaft 22 when the clutch assembly 30 is engaged results in an interaction between the cam surfaces 40 and 41 (FIG. 8) to urge the friction discs 34 and 39 on cam 32 and side gear 16 into firmer frictional engagement with the friction discs 33 and 33a on the carrier 14. This increases the rotation retarding or holding action of the engaged clutch assembly 30 and thereby prevents relative rotation between axle shafts 20, 22.

It is obvious that the angle of climb of the cam surfaces 40, 41 will determine the amount of axial movement of the cam member 32 for a given angular movement of the side gear 16 with respect to the cam member 32. To provide a regenerative self energizing clutch 30 of the present invention, the cam angle is given a value which provides for the axial movement of the cam member 32 by power derived from the side gear 16 with a mechanical advantage in favor of the cam member 32.

To provide a regenerative self energizing feature of the present invention, the actual angle given to the cams, number of "active", and number of "inactive" clutch discs will of course, be determined by the conditions under which the device is installed and operated. Taking all of these parameters into account there is a critical cam angle above which no mechanical advantage exists. Below the critical cam angle a mechanical advantage is provided as pointed out above and results in providing a regenerative self energizing clutch 30.

To provide the preferred form of the cam surface 40 of the present invention, it should be understood that the cam angle as hereinabove described increases at points spaced inwardly from the outer periphery of the cam surface and towards the common rotational axes of the members. 32, 16. Such a cam angle change is necessary due to the decrease in the circumferential distance. For example, at the pitch diameter of the cam surface 40, the effective cam angle will be approximately 12½° for an outer peripheral cam angle of 10°.

It should be understood that the cam surface 41 of the side gear 16 is formed in a corresponding manner to that hereinabove described in connection with the cam surface 40 of the cam member 32. It also should be understood that other cam angles can be used for different design and operational parameters.

The cam surfaces 40, 41 are formed so that the clutch will operate regardless of which wheel spins. For example, if the wheel connected to the shaft 20 spins and looses traction with the road, the side gear 16 will rotate at a greater speed than either the carrier 14 or the side gear 18. When this relative rotation exceeds a predetermined level, the actuator 50 will actuate the self energizing clutch system 30 in one direction to retard such relative rotation. If on the other hand, the wheel connected to the shaft 22 spins, the side gear 18 and the carrier 12 will rotate at a greater speed than the side gear 16. When this relative rotation exceeds a predetermined level, the actuator 50 will actuate the self energizing clutch system 30 in the other direction to retard such relative rotation. Thus, the cam surfaces 40, 41 are provided with cam angles on each side of the protruding portion which provide for a regenerative self energizing clutch system 30 which is capable of operating in both directions.

This actuation is accomplished smoothly and without grabbing or chatter since the retarding force on the cam member is limited by the torque limiting drive of the actuator 50. In addition it can be seen that differential action is completely uninhibited at low levels of differential action, while completely precluded at higher levels due to the discrete actuation characteristics of the clutch actuation mechanism.

cam element 32 forces the friction discs 33–39 into abutting frictional engagement. This frictional engagement is automatically increased by the regenerative self energizing clutch assembly 30 until the gear 16 and carrier 14 are interconnected through the cam element 32.

In some cases, the second portion 38 of clutch assembly 30 may be eliminated and all of the discs made "active". However, in the normal automotive and light truck type of differential mechanism, to which this invention relates, it has been found that the preferred arrangement is to use only a portion of the discs as "active"; the remainder being inactive. This is because if all of the discs which are needed to transmit the design torque of the differential mechanism are made "active," a very high cam angle must be used to insure that the maximum dynamic coefficient of friction is reached before final lockup of the differential mechanism. In effect, the cam angle provides a mechanical advantage to the "active" portion of the clutch system which determines the rate of lockup for a given rate of slip and number of "active" clutch plates.

For example, in normal automotive or light truck type differential, satisfactory results in the slip locking characteristics may be achieved by use of the following chart.

| MAX TORQUE REQUIRED | TOTAL NO. CLUTCH DISCS | EFFECTIVE CLUTCH DISC DIA. | EFFECTIVE CAM ANGLE | NUMBER OF "ACTIVE" CLUTCH DISCS |
|---|---|---|---|---|
| 1,500 ft. lb. | 5 | 3 | 12½°±2° | 3 |
|  | 5 | 3 | 22½°±4° | 5 |
|  | 7 | 3 | 32° ±4° | 7 |
| 3,000 ft. lb. | 9 | 3-¼" | 12½°±2° | 3 |
|  | 9 | 3-¼" | 22½°±4° | 5 |
|  | 9 | 3-¼" | 32° ±4° | 7 |
| 5,000 ft. lb. | 14 | 3-¼" | 12½°±2° | 3 |
|  | 14 | 3-¼" | 22½°±4° | 5 |
|  | 14 | 3-14" | 32° ±4° | 7 |

When the clutch assembly 30 is operated to the engaged condition, the spring 44 is in compression. This compressive force biases the clutch assembly 30 toward the disengaged condition. Once the relative rotation between the gear 16 and carrier 14 has been eliminated, the biasing spring 44 reverses the previous relative rotation between the side gear 16 and cam element 32 to move the clutch assembly 30 to the disengaged condition. The cam element 32 then rotates with the gear 16 relative to the carrier 14 and is moved axially outwardly for a small distance by the effect of the spring 44.

In view of the foregoing description, it can be seen that the regenerative self energizing clutch assembly 30 is operable from a disengaged condition in which the carrier 14 and side gear 16 are freely rotatable relative to each other to an engaged condition in which the clutch assembly 30 drivingly interconnects the carrier and gear to retard relative rotation therebetween. Upon the occurrence of a predetermined speed of relative rotation between the gear 16 and carrier 14, the actuator 50 rotates the cam element 32 relative to the side gear 16 to operate the clutch assembly 30 to the engaged condition. In the engaged condition, the cam surface 40 on the cam element 32 engages the cam surface 41 on the side gear 16 to prevent further relative rotation between the side gear and cam element and to press the cam element axially. The axial pressure of the The foregoing chart was compiled using 1/16 inch steel clutch discs having characterized frictional surfaces as shown in Russell U.S. Pat. No. 3,073,424. If heavier clutch discs were used, the total number of clutch surfaces required to transmit the torque could be reduced, however the number of clutch surfaces on the cam should remain approximately as shown in the chart.

Further, clutch discs of other materials or having other types of characterized surfaces may likewise be used to achieve satisfactory results. In this case, the particular number, diameter and arrangement of the clutch surfaces should be changed as befits the particular frictional characteristics and torque capacity of the clutch discs being used.

Having described my invention so as to enable one of ordinary skill in the art to practice it, I now claim:

1. A limited slip differential mechanism for transmitting drive forces to a pair of driven members, said differential mechanism comprising a carrier member defining a cavity, differential gear means disposed within said cavity for transmitting drive forces from said carrier to the driven members, said differential gear means including a pair of side gears adapted to be connected with the driven members and pinion gears disposed in meshing engagement with said side gears and connected with said carrier, self-energizing clutch means operatively connected with said carrier and one of said side gears and operable from a disengaged condition to an engaged condition to retard relative rotation between said one side gear and said carrier, and actuator means for initiating operation of said clutch means in response to a predetermined speed of relative rotation between said one side gear and said carrier, said clutch means including a cam member having portions cooperable with said one side gear to effect axial loading of said clutch means upon relative rotation of said cam member and said side gear, said actuator means including means for initiating relative rotation between said side gear and said cam member, said clutch means further including a first set of friction discs connected with said carrier for rotation therewith and a second set of friction discs interspersed with and coaxial with said first set of friction discs, said second set of friction discs including at least one first friction disc drivingly connected with said one side gear and at least one second friction disc drivingly connected with said cam member.

2. A limited slip differential as defined in claim 1 further including biasing means for urging said cam member toward said one side gear and for continuously pressing friction surfaces on said at least one first friction disc against friction surfaces on said first set of friction discs.

3. A limited slip differential as set forth in claim 2 wherein said biasing means includes a spring means acting between said member and said first friction disc, said spring means being effective to press friction surfaces on said friction disc against friction surfaces on said first set of friction discs.

4. A limited slip differential as set forth in claim 1 wherein said cam member comprises an axially movable member mounted in a coaxial relationship with said first and second sets of friction discs and said cooperable portions comprise a first annular undulating cam surface disposed on said cam member and a second annular undulating cam surface disposed on said one side gear.

5. A limited slip differential mechanism as set forth in claim 1 wherein said cam member cooperating portions include an undulating cam surface having an outer peripheral cam angle of 10° and pitch diameter cam angle of 12½°.

6. A limited slip differential mechanism as set forth in claim 1 wherein said cooperating portions include first and second annular undulating cam surfaces disposed in a coaxial relationship with said friction discs and detent means for restraining said first and second annular undulating cam surfaces against relative movement under the influence of forces transmitted between said first set of friction discs and said first friction disc.

7. A limited slip differential as set forth in claim 1 wherein said friction discs function as inactive and active frictions discs, said active friction discs providing a regenerative self-energizing force for actuating the clutch means, said active friction discs comprising more than two and less than eight friction discs and including said at least one second friction disc.

8. A limited slip differential mechanism for transmitting drive forces to a pair of driven members, said differential mechanism comprising a carrier member defining a cavity for holding a viscous fluid and differential gearing, differential gear means disposed within said cavity for transmitting drive forces from said carrier to the driven members, said differential gear means including a pair of side gears adapted to be connected with the driven members and pinion gears disposed in meshing engagement with said side gears and connected with said carrier, a regenerative self-energizing clutch means operatively connected with said carrier and one of said side gears and operable from a disengaged condition to an engaged condition to retard relative rotation between said one side gear and said carrier, said clutch means including a first set of friction discs connected with said carrier for rotation therewith and a second set of friction discs interspersed with said first set of friction discs and at least some of which are connected with said one side gear for rotation therewith, said friction discs having a plurality of friction surfaces which face each other and have slight surface irregularities, said friction discs being movable axially relative to each other from an initial condition in which said clutch means is disengaged through an intermediate condition to a final condition in which said clutch means is engaged, said plurality of friction surfaces being spaced apart and cooperating with the viscous fluid to transmit viscous shear drag forces between said friction discs when said friction discs are in said initial condition, said friction surfaces being disposed with at least some of said irregularities in engagement and a major portion of said friction surfaces spaced apart to transmit viscous shear and relatively small friction drag forces between said friction discs when said friction discs are in said intermediate condition, said friction surfaces being disposed in tight abutting engagement to transmit relatively large friction disc forces between said friction discs when said friction discs are in said final condition, said clutch means having a maximum dynamic coefficient of friction which is at least as great as 0.09 to promote smooth operation of said clutch means from the disengaged condition to the engaged condition as said friction discs move from said initial condition to said final condition, and actuator means for initiating operation of said clutch means from said disengaged condition to said engaged condition in response to a predetermined speed of relative rotation between said one side gear and said carrier, said clutch means including cam means operable from a first position through a second position to a third position to move said friction discs from said initial condition to said final condition, biasing means for urging said cam means to said first position, other friction discs of said second set being drivingly connected to said cam means, said actuator including means for effecting actuation of said cam means to effect movement of said cam means from said first position to said second position against the influence of said biasing means, and said cam means having friction and viscous shear drag forces applied thereto to effect operation of said cam means from said second position to said third position.

9. A limited slip differential mechanism as set forth in claim 8 wherein said cam means includes an undulating cam surface having an outer peripheral cam angle of 10° and pitch diameter cam angle of 12½°.

10. A limited slip differential mechanism for transmitting drive forces to a pair of driven members, said differential mechanism comprising a carrier member defining a cavity, differential gear means disposed within said cavity for transmitting drive forces from said carrier to the driven members, said differential gear means including a pair of side gears adapted to be connected with the driven members and pinion gears disposed in meshing engagement with said side gears and connected with said carrier, self-energizing clutch means operatively connected with said carrier and one of said side gears and operable from a disengaged condition to an engaged condition to retard relative rotation between said one side gear and said carrier, and actuator means for initiating operation of said clutch means in response to a predetermined speed of relative rotation between said one side gear and said carrier, said clutch means including a cam member having portions cooperable with said one side gear to effect axial loading of said clutch means upon relative rotation of said cam member and said side gear, said actuator means including means for initiating relative rotation between said side gear and said cam member, said clutch means further including a first set of friction discs connected with said carrier for rotation therewith and a second set of friction discs interspersed with and coaxial with said first set of friction discs, said second set of friction discs including at least one friction disc drivingly connected to said cam member.

11. A limited slip differential mechanism for transmitting drive forces to a pair of driven members, said differential mechanism comprising a carrier member defining a cavity, differential gear means disposed within said cavity for transmitting drive forces from said carrier to the driven members, said differential gear means including a pair of side gears adapted to be connected with the driven members and pinion gears disposed in meshing engagement with said side gears and connected with said carrier, self-engaging clutch means operative connected with said carrier and one of said side gears and operable from a disengaged condition to an engaged condition to retard relative rotation between said one side gear and said carrier, and actuator means for initiating operation of said clutch means in response to a predetermined speed of relative rotation between said one side gear and said carrier, said clutch means including a cam member having portions cooperable with said one side gear to effect axial loading of said clutch means upon relative rotation of said cam member and said side gear, said actuator means including means for initiating relative rotation between said side gear and said cam member, said clutch means further including a first initially active portion and a second initially inactive portion, said first initially active portion comprising a plurality of alternately interleaved clutch discs, certain of the clutch discs in said initially active portion being mounted for driving engagement with said carrier and other of said clutch discs being mounted for driving engagement with said cam member, and said initially inactive portion also comprising a plurality of alternately interleaved clutch discs, certain of the clutch discs in said inactive portion being mounted for driving engagement with said carrier and other of said clutch discs being mounted for driving engagement with said side gear.

* * * * *

UNITED STATES PATENT OFFICE
CERTIFICATE OF CORRECTION

Patent No. 3,831,462    Dated  August 27, 1974

Inventor(s)  Jerry F. Baremor

It is certified that error appears in the above-identified patent and that said Letters Patent are hereby corrected as shown below:

Column 13, line 30, "effective" should read -- ineffective --. Column 16, line 3, "self-engaging" should read -- self-energizing --; line 4, "operative" should read -- operatively --.

Signed and sealed this 5th day of November 1974.

(SEAL)
Attest:

McCOY M. GIBSON JR.
Attesting Officer

C. MARSHALL DANN
Commissioner of Patents